United States Patent Office 2,966,853
Patented Jan. 3, 1961

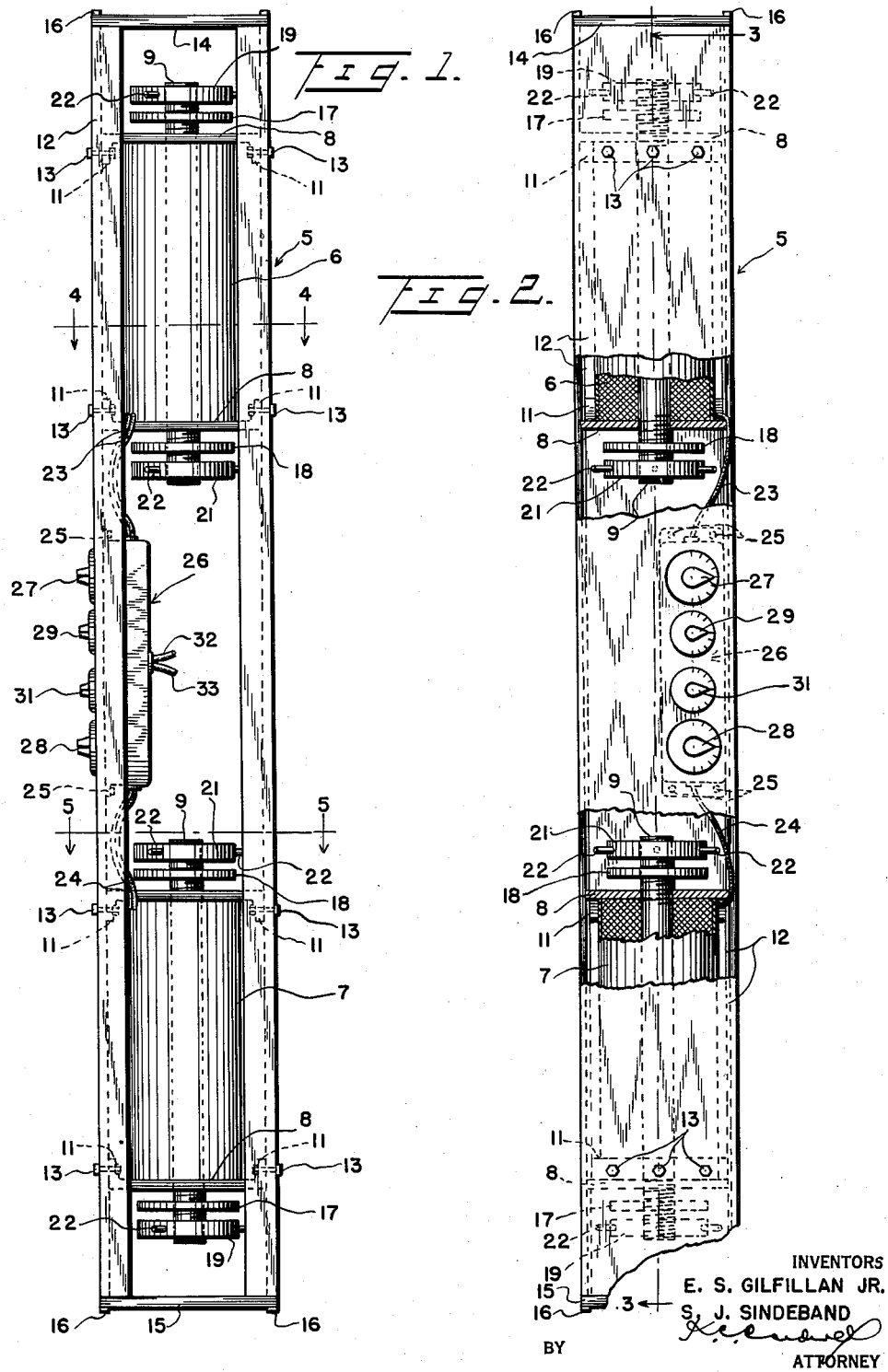

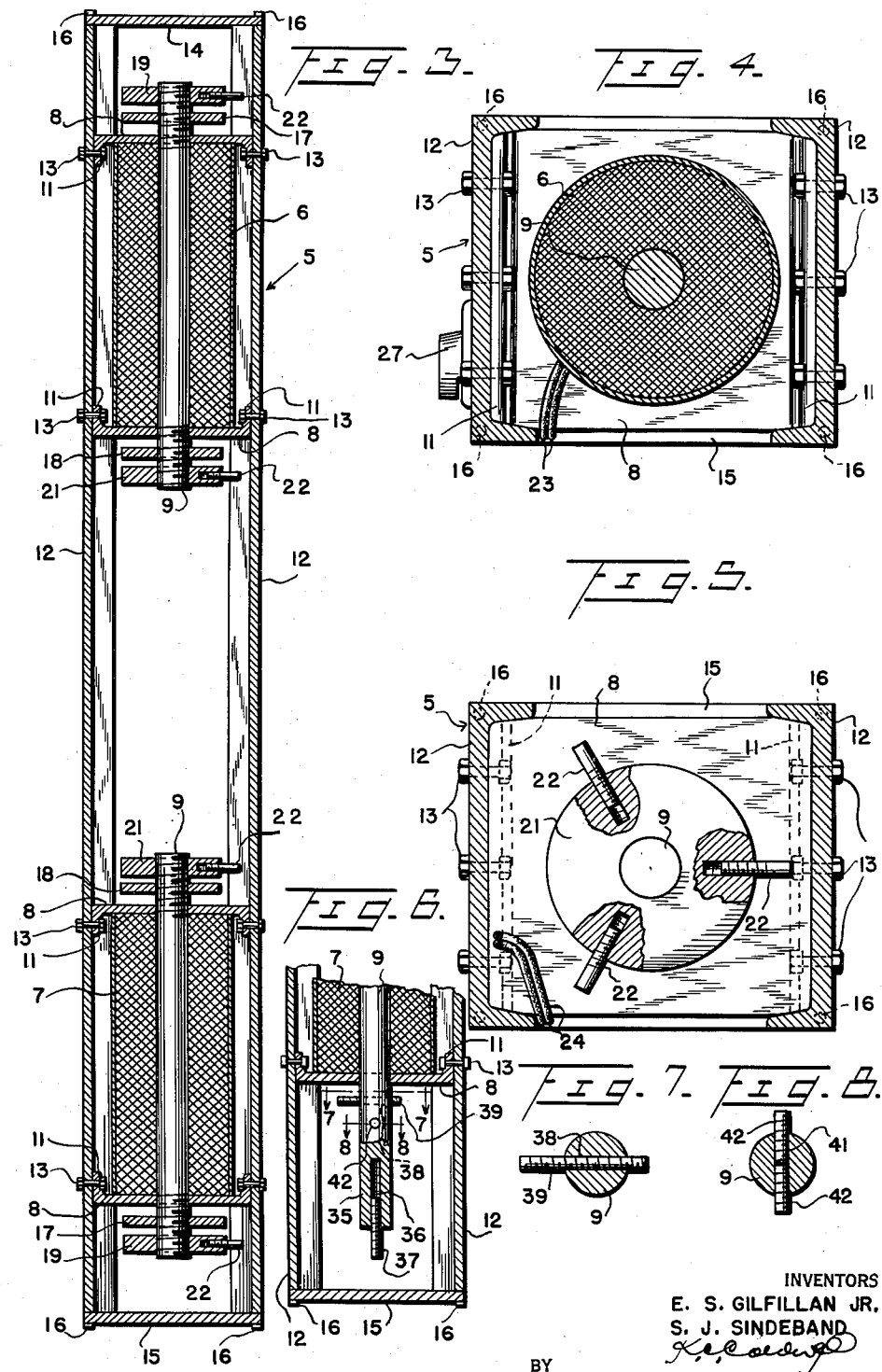

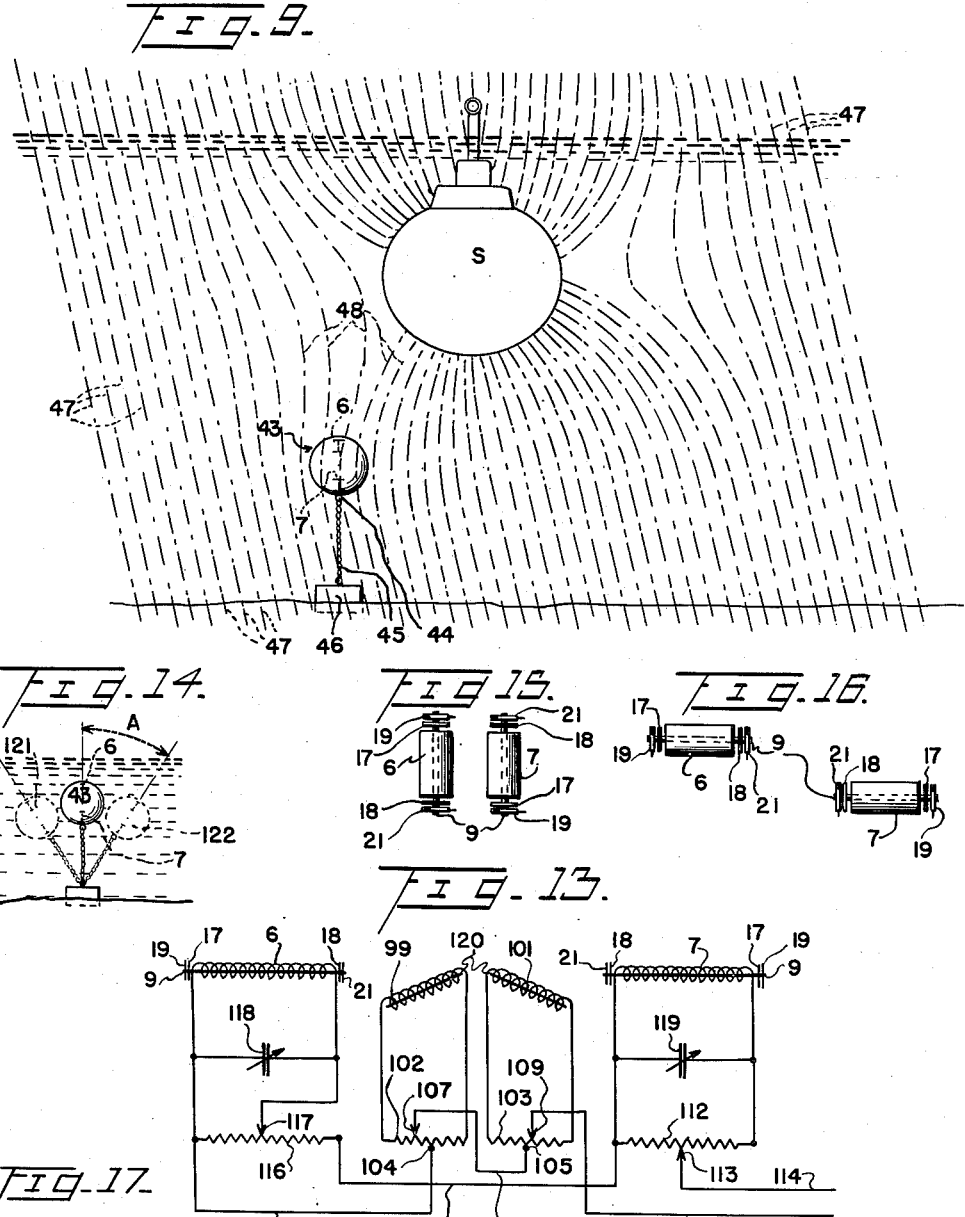

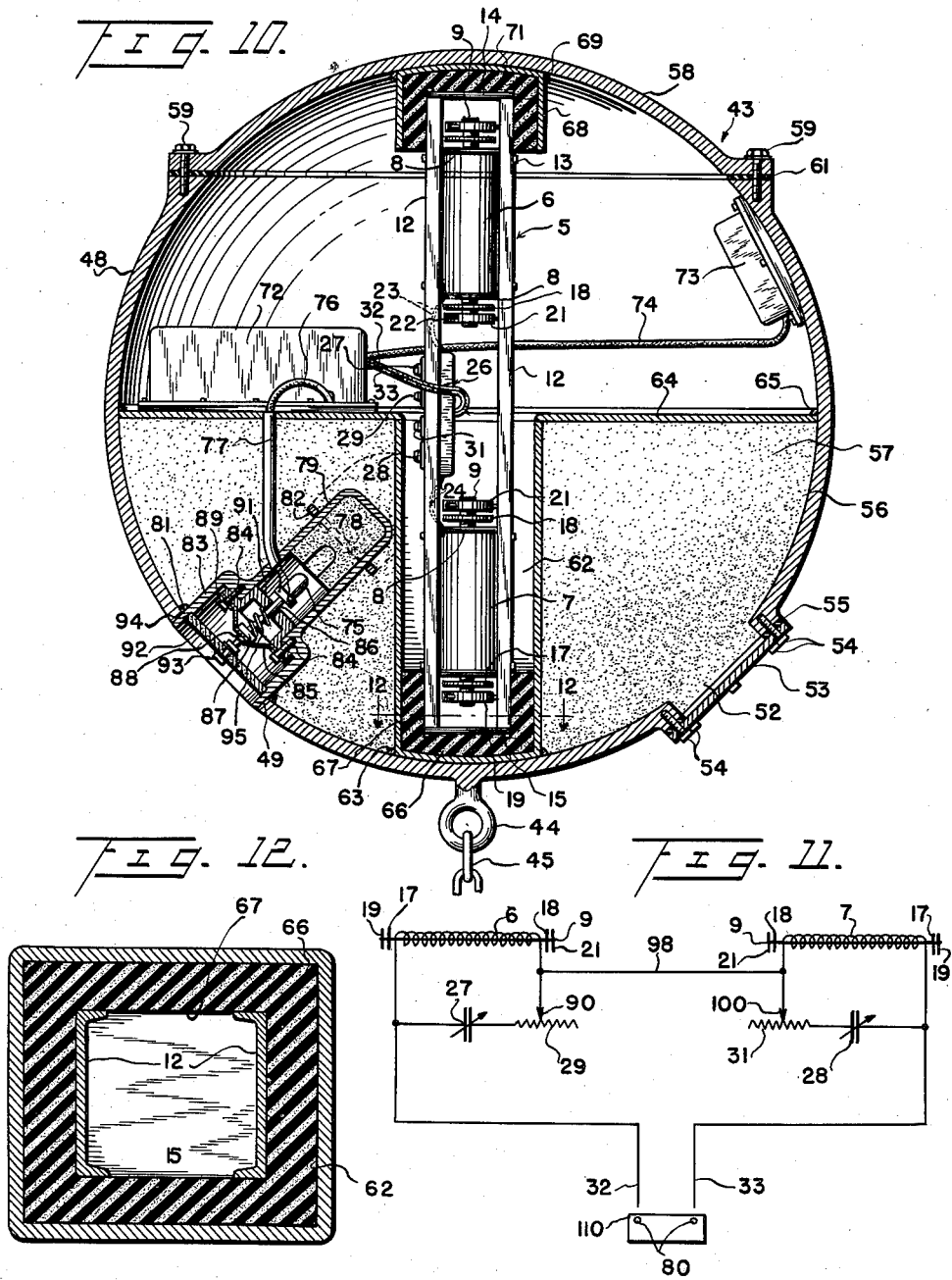

2,966,853

BUOYANT MINE WITH GRADIOMETER

Edward S. Gilfillan, Jr., Manchester, Mass. (10 S. Prospect St., Oberlin, Ohio), and Seymour J. Sindeband, 340 E. 72nd St., New York, N.Y.

Filed Oct. 27, 1941, Ser. No. 416,742

14 Claims. (Cl. 102—18)

(Granted under Title 35, U.S. Code (1952), sec. 266)

This invention relates to a device for detecting small changes in gradients of magnetic fields. More specifically the invention relates to the art of balancing gradiometer units to such a degree of precision that they may be usefully employed for detecting small irregularities or changes in gradients in magnetic fields.

In devices of this character hereinbefore proposed in which ferromagnetic cores have been employed within the detecting coils, the devices have been provided with a stationary mounting for the detection of passing vehicles. Difficulty has been experienced because of lack of equality of pickup of the two main detecting coils, lack of alinement of the magnetic axes, lack of equality of the self-inductance of the two coils, and lack of equality of the distributed capacity and of resistance of the two coils.

The device of the present invention possesses all of the advantages of the devices heretofore proposed and, in addition, is adapted to detect the approach of magnetic objects while the device is in motion and is further adapted to detect the presence of magnetic objects while the device is being rotated within their vicinity. The device is also adapted to be rotated in a uniform magnetic field such, for example, as the terrestrial field of the earth without developing any appreciable voltage when no magnetic object is disposed within the vicinity of the device. If, however, there is a magnetic object within the vicinity of the device when it is rotated, a voltage appears at the output terminals thereof. The gradiometer device of the present invention is also adapted to be maintained stationary and detect the passage of nearby magnetic objects as in the case of devices of this general character heretofore devised.

The main object of the present invention is to teach the art of balancing gradiometer devices in which the apparatus is unresponsive to time rates of change of intensity of or motion relative to uniform magnetic fields having substantially parallel lines of force within which the device is disposed, and such that the device is responsive to time rates of change of intensity of or motion relative to non-uniform magnetic fields.

Another object of the invention is to provide a device unresponsive to time rates of change of intensity of or motion relative to uniform magnetic fields having substantially parallel lines of force within which the device is disposed, and such that the device is responsive to time rates of change of intensity of or motion relative to non-uniform magnetic fields.

A further object is to provide a device which is unresponsive to translatory or rotary motions of the device in the earth's magnetic field and which is sensitively responsive to the approach to or of magnetic objects.

A further object of the invention is to provide an apparatus unresponsive to rotation in a uniform magnetic field and adapted to detect and measure the non-uniformity of a magnetic field within which it is rotated.

A general object of the invention is to provide means for locating magnetic bodies or geological magnetic irregularities in a manner substantially independent of motion of the device and of the effects of magnetic storms.

A further object of the invention is to teach the art of balancing a gradiometer device primarily by magnetic means so that the device is unresponsive to motion relative to a uniform magnetic field but responsive to motion of the device relative to or time rates of change of intensity of a non-uniform magnetic field.

A further object of the invention is to teach the art of balancing a gradiometer device primarily by electrical means in which the device is unresponsive to time rates of change of intensity of or motion relative to uniform magnetic fields having substantially parallel lines of force within which the device is disposed, and such that the device is responsive to time rates of change of intensity of or motion relative to non-uniform magnetic fields.

Still further objects, advantages, and improvements will be apparent from the following description, taken in connection with the accompanying drawings of which:

Fig. 1 is a view in elevation of a preferred embodiment of the invention;

Fig. 2 is a side view, partially in section and partially broken away, of the device of Fig. 1;

Fig. 3 is a view taken substantially along the line 3—3 of Fig. 2;

Fig. 4 is a view somewhat enlarged taken along the line 4—4 of Fig. 1;

Fig. 5 is a view, somewhat enlarged and partially broken away, taken along the line 5—5 of Fig. 1;

Fig. 6 is a view, partially in section and partially broken away, of an alternative form of the device;

Fig. 7 is a view, partially in section and somewhat enlarged, taken susbtantially along the line 7—7 of Fig. 6;

Fig. 8 is a view somewhat enlarged and partially in section taken along the line 8—8 of Fig. 6;

Fig. 9 illustrates diagrammatically the distortional effect of a submarine upon the earth's magnetic field within the vicinity of the device;

Fig. 10 is a view somewhat enlarged and partially in section, of the device of Fig. 1 employed with the mine of Fig. 9;

Fig. 11 illustrates in diagrammatic form a circuit arrangement suitable for use with the mine of Figs. 9 and 10;

Fig. 12 is a view somewhat enlarged and partially in section taken along the line 12—12 of Fig. 10;

Fig. 13 illustrates in diagrammatic form an alternative arrangement for balancing the gradiometer device;

Fig. 14 is a diagrammatic view showing the mine of Fig. 9 in different angular positions;

Figs. 15 and 16 show diagrammatically modifications in the arrangements of the gradiometer coils; and, Fig. 17 shows the spaced relation between the pickup coils of Fig. 13 and the magnetic rods.

Referring now to the drawings on which like numerals of reference are employed to designate like parts throughout the several views, and more particularly to Figs. 1, 2, and 3 thereof, there is shown thereon a gradiometer device indicated generally by the numeral 5 comprising a pair of gradiometer coils 6 and 7 having supporting members 8 secured to a magnetic core 9 in any suitable manner such, for example, as by threading the parts together. The core 9 is composed of ferromagnetic material such, for example, as a material known in the trade as Permalloy, having a composition of substantially 87½ percent nickel, 8½ percent iron, and 4 percent molybdenum heated after fabrication to a temperature of approximately 1100 degrees centigrade, and thereafter assembled within the gradiometer device as in the manner illustrated. It will, of course, be understood that the Permalloy core or bar 9 is preferably not subjected to any appreciable mechanical deformation after the heat treatment has been applied thereto. The core may also, if desired, be made from other material suitable for the purpose such, for example, as relatively pure and suitably heat treated iron, an alloy known in the trade as hypernick, having a composition of substantially equal parts of iron and nickel, or a material known in the trade as Numetal, having a composition of substantially 87½ percent nickel, 8½ percent iron, and 4 percent copper.

The supporting members 8 are preferably of non-magnetic material having bent over portions 11 adapted to engage non-magnetic channel shaped members 12 secured thereto as by the bolts 13. A pair of plates 14 and 15 are securely clamped to the ends of the channel shaped pieces 12 as by the bolts 16. A rigid structure is thus provided within which the coils 6 and 7 are disposed in spaced relation with the axes of the coils in substantial coincidence with each other. A pair of discs 17 and 18 of magnetic material are threaded upon the core 9 thereby providing means settable at will for adjusting the self-inductance of the coils 6 and 7 whereby the self-inductance of the coils may be balanced. Also threaded upon the core 9 is a pair of adjustable pickup caps 19 and 21, having a plurality of radially extending members 22 extending therefrom and secured thereto as by threading the members into tapped holes within the pickup caps 19 and 21. The pickup caps 19 and 21 are employed for adjusting the flux gathering power of the gradiometer coils by varying the position of the flux gathering caps with respect to the ends of the magnetic rod 9. The members 22 extending angularly from the magnetic pickup caps 19 and 21 are of ferromagnetic material and are adapted to be set to different positions with respect to the pickup caps whereby the magnetic axes of the coils may be brought into exact alinement with each other. The coils 6 and 7 comprise substantially the same number of turns of wire and preferably possess the same properties of resistance, inductance, and distributed capacity as nearly as may be obtained with commercial methods of fabrication. Each of the coils 6 and 7 is provided with a pair of electrical conductors indicated generally at 23 and 24, respectively, for establishing an external circuit connection with the coils. The manner in which the capacity and resistance of the coils 6 and 7 are caused to be balanced will become more clearly apparent as the description proceeds.

Secured to one of the channel shaped members 12 as by the bolts 25 is a control or balancing unit indicated generally by the numeral 26 comprising the variable condensers 27 and 28 in electrical circuit with the variable resistance units 29 and 31 respectively, by means of which the final electrical adjustment or balance of the coils 6 and 7 is obtained. A pair of electrical conductors 32 and 33 extend from the control unit 26 and are employed to establish an electrical connection between the coils 6 and 7 and the control unit to certain control mechanism adapted to respond to voltage indications resulting from irregularities of the magnetic field within which the gradiometer device is disposed.

Referring now to Fig. 6 of the drawings on which is shown an alternative form of the invention, the core 9 is provided with an extended portion 35 having a tapped hole 36 within the end thereof in axial alinement with the core within which is disposed a magnetic rod 37 in threaded engagement with the core thereby providing an arrangement in which the effective length and pickup power of the core 9 may be varied at will by the adjustment of the magnetic rod 37. The core 9 is also provided with a tapped hole 38 passing transversely through the rod 9 in intersecting relation with the axis thereof within which is disposed a ferromagnetic rod 39, Fig. 7, preferably, though not necessarily, of somewhat greater length than the thickness of the rod 9 by means of which the magnetic axis of the rod may be shifted in a direction transverse to the axis of the rod in accordance with the adjusted position of the rod 39. Whereas in the embodiment of the invention illustrated on Fig. 7 a single rod 39 is employed, it will be understood that, if desired, two rods 39 may be threaded into the tapped hole 38 whereby the phase of the voltage generated by the coil 7 and the self-inductance of the coil may be adjusted somewhat independently of each other. There is also provided on the core 9, preferably intermediate the tapped hole 38 and the rod 37, a tapped hole 41 transverse to the axis of the core 9 and preferably, though not necessarily, at a right angle with the axis of the rod 39. A threaded rod 42 is disposed within the tapped hole 41 whereby the magnetic axis of the core 9 may be angularly shifted transversely in either direction with respect to the axis of the member 39. If desired, two rods 42 may be employed generally in the manner and for the purpose of the pair of rods 39. An arrangement is thus provided in which, by adjustment of the magnetic members 39 and 42 at either end of the core 9, the magnetic axes of the coils 6 and 7 may be angularly adjusted in any desired direction into exact alinement or parallelism with each other.

On Fig. 9 is illustrated a submarine mine indicated generally by the numeral 43 having an eye bolt 44 to which is secured a chain 45 terminating in an anchor 46 by means of which the mine is moored. The casing of the mine, the mooring chain and anchor are preferably of any non-magnetic material suitable for the purpose. Within the mine is disposed the gradiometer device comprising the coils 6 and 7 in axial alinement with each other substantially as illustrated. A submarine S is also shown partially submerged within the vicinity of the mine 43.

As is well known, the terrestrial magnetic field comprises lines of force which are perpendicular to the surface of the earth at the north and south poles and in general parallel to the surface of the earth at the magnetic equator, the angle of inclination or dip of the magnetic field with the surface of the earth increasing with an increase of magnetic latitude. On Fig. 9 is illustrated by the broken lines 47 a portion of the earth's magnetic field at some distance from ferromagnetic objects in which the lines of magnetic force are substantially parallel to each other. The lines of force, such as those indicated at 48, are curved or deflected by the presence of a ferromagnetic body such as the submarine S illustrated, so that the direction of the lines of force passing through the mine 43 is varied sufficiently to cause the flux linkages of the coil 6 with the magnetic field to be different in number than the flux linkages of the coil 7 with the field. As the submarine approaches the mine, an electromotive force is generated within the coil 6 different from the electromotive force generated within the coil 7 whereby a gradient signal is set up by the gradiometer device sufficient to operate the mine firing mechanism and thus detonate the mine. The manner in which this is accomplished will be more clearly apparent as the description proceeds.

On Fig. 10 is illustrated somewhat in detail the mine 43 comprising a casing 48 provided with an aperture 49 within which is disposed the hydrostat extending mechanism for the detonating device. The casing 48 is also provided with an aperture 52 adapted to be hermetically sealed by the cover 53 and bolts 54, a gasket 55 being inserted preferably between the cover 53 and the casing of the mine to prevent seepage of the sea water within the mine. The mine is also provided with a chamber 56 within which is disposed an explosive charge 57. The casing 48 is provided with a cover 58 secured thereto as by the bolts 59 in hermetically sealed relation as by the gasket 61. The mine is also provided with a well 62 secured to the mine casing in any suitable manner as at 63 and a partition 64 secured preferably to the well and to the casing of the mine as at 65. A resilient pad or bushing 66 of material suitable for the purpose such, for example, as sponge rubber and having an aperture 67 therein is inserted within the well 62 whereby the gradiometer device 5 is yieldably supported at the lower end thereof within the well 62.

The cover 58 is provided with a bushing 63 secured thereto as at 69 within which is disposed a yieldable pad 71, in general similar to the pad 66 within which is disposed the opposite or upper end of the gradiometer device 5. The gradiometer device is thus yieldably supported by the pads 66 and 71 whereby the gradiometer device is protected from damage or injury during the handling, transportation or planting of the mine.

A pair of conductors 32 and 33 extending from the controlling device 26 are in electrical connection with a firing control mechanism 72 whereby the gradient of the signals generated by the coils 6 and 7 is employed to control the operation of the firing mechanism during the time that the mine is in an armed condition in response to signals received from an acoustic detecting device 73 in electrical connection therewith as by the cable 74.

The control mechanism 72 may be of any type suitable for the purpose such, for example, as the firing mechanism disclosed in the copending patent application of James B. Glennon, Elihu Root, III, Robert H. Park, and Edward S. Gilfillan, Jr., Serial No. 411,318, filed September 18, 1941, now Patent No. 2,892,403, for Mine Firing Mechanism. The firing control mechanism 72 is also in electrical connection with the detonating device 75 as by the electrical cable 76 passing within the cable duct 77 whereby the detonating device is caused to explode the booster charge 78 within the booster chamber 79 in response to the closure of a firing circuit by the firing mechanism. The booster chamber 79 is supported within the casing 48 and in sealed relation thereto as at 81, and additionally supported as by the member 82 extending between the chamber 79 and the casing.

The booster chamber 79 comprises a portion 83 having secured thereto as by the bolts 84, a flexible diaphragm 85 within which is disposed a plunger 86 having a collar 87 thereon to which the diaphragm is secured in watertight relation as by the nut 88. A retaining ring 89 maintains the diaphragm in sealed relation with a member 91 within which the plunger rod 86 is slideably supported. The detonator 75 is secured to one end of the plunger 86 and adapted to be inserted within the booster charge 78 as the hydrostat operates. A soluble washer 92 is secured to the plunger rod 86 in any suitable manner as by the nut 93, the outer edge of the washer being in engagement with a shoulder 94 of the extended portion 83 whereby movement of the hydrostat is prevented until the mine has been planted for a time sufficient to cause the washer 92 to dissolve or soften sufficiently to permit the pressure of the water against the diaphragm 85 to overcome the resistance of the spring 95 and operate the hydrostat.

A circuit arrangement suitable for use with the mine of Fig. 10 is shown on Fig. 11 in which the conductors 32 and 33 are connected to one end of the winding of each of the coils 6 and 7 and to the variable condensers 27 and 28, respectively. The other end of the windings of the coils 6 and 7 are connected together by the conductor 98, the conductor 98 also being in circuit with the variable contact elements 90 and 100 of the resistance units 29 and 31. The other terminal of each of the resistance units 29 and 31 is in electrical connection with the condensers 27 and 28, respectively.

The operation of the device will now be described.

Let it be assumed by way of example, that the mine 43 has been launched within a body of water adjacent the path of travel of the submarine S for a period of time sufficient to allow the soluble washer 92 to dissolve or soften sufficiently to cause the detonator 75 to be inserted within the booster charge 78 and the submarine S has approached within a predetermined distance of the mine thereby to cause the acoustic detector 73 to operate and set the mine firing mechanism 72 into operation thereby arming the mine. As the submarine S continues to approach the mine the magnetic field indicated generally by the lines of force 48, Fig. 9, is distorted or deflected sufficiently to cause the number of flux linkages of the coil 6 with the magnetic field to be different from the flux linkages of the coil 7 with the field. An electric signal is thus given by the generation of different voltages within the coils 6 and 7 of a magnitude sufficient to cause the firing mechanism 72 to operate thereby energizing the detonator 75, and causing the mine to explode.

The resistances 29 and 31 and the condensers 27 and 28 coact with the magnetic adjusting caps 17, 18, 19, and 21, as the device is moved or rotated in a uniform magnetic field such that the voltages generated by the linkage of the coils with the magnetic field as the coils 6 and 7 are moved or rotated are exactly balanced. We have found that, in the absence of the balancing devices such, for example, as the magnetic adjusting caps, resistances and condensers hereinbefore referred to, the gradiometer device is in an unbalanced condition, this lack of balance being due, generally, to unequal pickup power of the two coils 6 and 7 and primarily to the lack of alinement of the magnetic axes of these coils. Further unbalance of the coils we have found to result from inequality of self-inductance of the coils 6 and 7, inequality of the distributed capacity associated with these coils, and inequality of the resistances of the coils. To correct this difficulty, the device is adjusted for balance in the following manner: Inequalities of pickup power of the coils are adjusted, according to the preferred embodiment of our invention illustrated on Fig. 11, by adjusting the outer caps 19 and 21 along the rods 9 until the response of a suitable indicating device, indicated generally at 110, due to the unbalance of the coils when the gradiometer is rotated in a uniform magnetic field is reduced to a minimum. The indicating device 110, it will be noted, is provided with a pair of terminal connectors 80 adapted to receive the conductors 32 and 33 and thereby establish an electrical connection with the gradiometer for the purpose of balancing the gradiometer or using the gradiometer as an indicating device. When the unbalance of the coils has been minimized by the foregoing procedure, the phase of the residual unbalanced voltage is corrected by adjustment of the members 22, Fig. 1, until no further reduction of unbalanced voltage can be effected by additional adjustment of the members. A still further improvement may be obtained, if desired, by additional adjustment of the caps 19 and 21.

Adjustment of the caps and members may be continued in the manner described until an additional degree of reduction in the unbalanced voltage is obtained. We have found that, after the foregoing adjustments have been made, the unbalance voltage generated by rotating the gradiometer in a uniform field in one direction is somewhat unequal to the unbalance voltage generated when the gradiometer is rotated in the opposite direction. This is an indication of inequality of self-inductance of the two coils and is corrected by an adjustment of the setting of the magnetic discs 17 and 18 until the residual voltage is found to be the same when the gradiometer is rotated in either direction about the same axis at the same speed of rotation. After the self-inductance of the coils 6 and 7 has been equalized in the manner described, it is usually advantageous to adjust the caps 19 and 21 and the members 22 additionally, thereby to obtain a still further reduction of unbalance voltage. After this additional adjustment has been made, a still further decrease of the unbalance voltage can be obtained by adjustment of the resistances 29 and 31 and the condensers 27 and 28 of Fig. 11.

Any well known indicating means indicated generally at 110, suitable for the purpose may be employed such, for example, as a sensitive galvanometer, a microammeter, or a recording fluxmeter, and a direct current vacuum tube amplifier may be inserted, if desired, intermediate the gradiometer device and the indicating means. We prefer, however, to employ for indicating purposes, a device known in the art as an interrupter or chopper such, for example, as the interrupter or chopper disclosed in the copending application, Serial No. 411,318 filed September 18, 1941, now Patent No. 2,892,403, hereinbefore referred to, whereby the low frequency alternating current generated by the gradiometer device as the device is rotated within a magnetic field is converted into a high frequency alternating current and amplified by a suitable alternating current amplifying device.

From the foregoing it will be noted that an arrangement and method have been disclosed for correcting the disturbing effects of lack of equal pickup power of a pair of gradiometer coils, in which the lack of parallelism of magnetic axes, inequality of self-inductance, inequality of distributed capacity, and inequality of resistance of the detecting coils of the device have been minimized, thus making it possible to use the gradiometer for detecting small variations or inequalities in a magnetic field within which the gradiometer is moved and rotated, and to detect the approach of ferromagnetic objects to the gradiometer.

In the alternative arrangement shown in Fig. 6, the adjustment of pickup power is made by varying the effective length of the rods 9 by adjustment of the magnetic rods 37 in or out of the rods 9. Adjustment of the magnetic axes of the rods to parallelism is obtained by varying the extent in which the rods 39 and 42 project from either side of the holes 38 and 41 in the core 9. Self-inductance of the coils 6 and 7 is adjusted by changing the total length of rods 39 and 42 projecting from the holes 38 and 41, respectively. This may be accomplished by either employing two rods in each of the tapped holes, or by employing rods of different lengths. Adjustment of the distributed capacity and resistance is accomplished in the manner heretofore stated. It will be understood that, in the embodiment of the invention shown on Fig. 6, the order and method of adjustment of the device to vary the pickup power of the coils 6 and 7, the angular alinement of the magnetic axes of the rods 9, the self-inductance of the coils 6 and 7, and the distributed capacity of the resistance of each of the coils is accomplished generally in the manner of the device of Figs. 1 and 11. It will, of course, be understood that when the arrangement of Fig. 6 is employed, the magnetic discs such as 17, 18, 19 and 21, are not required.

An alternative form of the invention is shown on Fig. 13, in which the magnetic adjusting means of Figs. 1 and 6 have been replaced by two pickup coils 99 and 101 preferably having magnetic rods 120 respectively disposed within the coils with their axes substantially perpendicular to each other and to the detecting coils 6 and 7. The pickup coil 99 is shunted by a variable resistance 102 and the pickup coil 101 by a variable resistance 103. The resistances 102 and 103 are each provided with a center tap 104 and 105, respectively, the tap 104 being in electrical connection with one end of the coil 6 as by the conductor 106. The center tap 105 is connected to the variable element 107 of resistance 102 as by the conductor 108. The variable element 109 of resistance 103 is connected to an indicating device or firing mechanism, as the case may be, by the conductor 111.

A resistance 112 is connected across the gradiometer coil 7 and provided with an adjustable element 113 in electrical connection with an outgoing conductor 114 extending to the indicating device or firing mechanism referred to above. The coil 7 is connected at one end thereof as by the conductor 115 to one end of a resistance unit 116 having the other end thereof in electrical connection with conductor 106. The resistance unit 116 is provided with a variable element 117 in electrical connection with one end of the gradiometer coil 6. A pair of variable condensers 118 and 119 are connected in parallel with the gradiometer coils 6 and 7 respectively. The manner in which the device is adjusted to compensate for an unbalance of electric signals generated by the coils 6 and 7 as the gradiometer device is rotated within a uniform magnetic field or the magnetic field is moved with respect to the device will now be described.

As is well known, the flux pickup power of magnetic rods of the character disclosed varies as the square of the length of each of the rods. Assuming, by way of example, that the length of the rod 120 of Fig. 13 is doubled, the flux pickup power of the rod would be increased fourfold. The coils 99 and 101, it will be noted, are smaller than the coils 6 and 7, likewise the rods 120 are smaller than the rods 9 and, for this reason, the voltages generated within the coils 99 and 101 are considerably less than the voltages generated within the coils 6 and 7. The resistances 104 and 105 are preferably less than the internal resistance of the coils 6 and 7 but of sufficient size to insure that the currents generated by the coils 6 and 7 are substantially in phase with the voltages generated within these coils. The voltage generated by the coils 99 and 101 are in quadrature relation with the voltages generated within the coils 6 and 7 and, for this reason, are suitable for balancing differences in the phase of the voltages generated within the coils 6 and 7 when the device is rotated within a uniform magnetic field, independently of the direction of rotation of the device within the field.

Due to irregularities inevitably incident to manufacture, the coils 6 and 7 will not have the same pickup power, the same axis, the same self-inductance, or the same distributed capacity, and these irregularities will result in the generation of small voltages when the device is disposed within a magnetic field having the lines of force thereof all parallel, as the device is moved or rotated with respect to the field. The arrangement of the circuit and parts diagrammatically shown on Fig. 13 provides a plurality of means settable at will for minimizing the effect of these irregularities by a combination of electrical and magnetic devices which coact to produce the desired result. Misalinement of the magnetic axes of coils 6 and 7 is adjusted in part by tapping off at members 117 and 113 quadrature voltages from resistances 116 and 112 respectively in the manner shown on Fig. 13, and to a somewhat lesser degree by adjusting the condensers 118 and 119. Difference in self-inductance of the coils 6 and 7 is partially neutralized by adjustment of the auxiliary caps 17 and 18.

It will, of course, be understood that the primary method of electrical balance as shown in Fig. 13 is adapted, if desired, to be advantageously combined with the primarily magnetic method of balancing hereinbefore described, or either of the methods of balancing may be employed independently of the other.

To balance the form of gradiometer illustrated on Fig. 13, the pickup power of the coils 6 and 7 is adjusted to equality by varying the setting of the adjustable elements 113 and 117 and rotating the coils 6 and 7 for at least one revolution within a uniform magnetic field such, for example, as the earth's magnetic field, while the gradiometer is connected to an indicating instrument such as illustrated at 110. The effect of misalinement of the magnetic axes of coils 6 and 7 is compensated by adjusting the setting of the elements 107 and 109 and rotating the gradiometer in a magnetic field about various axes. Variations of distributed capacity and self-inductance are partially, though not necessarily completely adjusted by varying the settings of the condensers 118 and 119 as the gradiometer is rotated in a uniform magnetic field in both directions about a fixed axis.

It has been found that, unless the foregoing adjustments have been properly made, the background signal resulting from motion or rotation of the gradiometer within a uniform magnetic field exceeds the signal generated by relative movement of the device with respect to ferromagnetic bodies and, for this reason, the above described adjustments are necessary in order that a gradiometer device may be usefully employed to detect relative motion between a submarine or other ferromagnetic body, or geological magnetic irregularity with respect to the device.

Referring now to Fig. 14, the effect of angular motion of a moored mine such, for example, as the mine 43 as the result of changes in the direction of tidal currents or as the result of the action of waves or the like is illustrated. The mine 43 assumes a substantially vertical position when no tidal currents or other water movements are present, this position being indicated in solid outline, and the gradiometer coils 6 and 7 have their axes substantially perpendicular to the surface of the earth and, furthermore, no relative movement between the coils 6 and 7 and the earth's magnetic field is present. The mine may be moved angularly from the position illustrated in solid outline in any direction due to the action of the waves or tidal currents hereinbefore referred to into any position, such as illustrated at 121 and 122, respectively, in which the coils 6 and 7 have been moved from the vertical position through an angle, indicated at A. Assuming, for the purpose of disclosure, that the gradiometer within the mine 43 has been properly balanced in accordance with the teaching of the present invention, the differential voltage generated by the shift of the axes of the coils through the angle A with respect to the earth's magnetic field will be insufficient to operate the firing device of the mine in the event that the mine be armed at the time by the acoustic detector, and thus the mine is not destroyed by the action of the waves or tidal current as would be the case if the gradiometer were not balanced in accordance with this invention. If, however, a ferromagnetic object, such as a ship or a submarine is nearby or within the immediate vicinity of the mine as the device within the mine swings at its mooring, or is in any of the moved positions, or in the original upright position, as the case may be, the mine will fire, thus accomplishing the object of damaging the vessel, regardless of the instant position of the mine.

On Figs. 15 and 16 are shown two alternative arrangements of the gradiometer coils 6 and 7. Referring now specifically to Fig. 15, the coils 6 and 7 are disposed with their ferromagnetic cores 9 substantially parallel to each other and disposed in side-by-side relation instead of coaxially as heretofore shown. It will be clear to those skilled in the electrical art that the gradiometer device shown on Fig. 15 is adapted to be balanced and used in substantially the manner hereinbefore described.

A gradiometer arrangement is shown on Fig. 16 in which the axes of the coils thereof are parallel but not necessarily disposed coaxially or side-by-side, and in which the coils are adapted to be balanced and used in the manner described above for detecting small gradients of magnetic fields.

The term gradiometer as employed herein shall be construed to define a device in which two opposedly connected coils of substantially identical construction, having substantially identical ferromagnetic rods or cores disposed therein are arranged with their axes substantially parallel to or in alinement with each other.

The term pickup coil is employed herein to define a coil having preferably, though not necessarily, a ferromagnetic core disposed therein, adapted to generate a voltage in response to changes in orientation or position of the coil with respect to the magnetic field within which the coil is disposed, or changes in the intensity of said magnetic field.

Briefly stated in summary, the invention provides a device and circuit arrangements therefor adapted to measure small gradients in magnetic fields and to detect the approach of or to magnetic objects or irregularities irrespective of motion of the device or the effects of magnetic storms. Furthermore, this invention teaches the art of balancing gradiometer devices to adapt them to be irresponsive to angular movements of the devices within a uniform magnetic field whereby the devices may be adjusted to such a degree of precision that small gradients of magnetic fields may be detected by the devices.

While the invention has been described with reference to several embodiments thereof which give satisfactory results, it will be understood by those skilled in the electrical art to which the invention pertains, after understanding the invention, that various changes and modifications may be made without departing from the spirit and scope of the invention, and it is our intention therefore, to cover in the appended claims, all such changes and modifications.

The invention herein described may be manufactured and used by or for the Government of the United States of America for governmental purposes without the payment of any royalties thereon or therefor.

What is claimed as new and desired to be secured by Letters Patent of the United States is:

1. A device of the character disclosed for detecting small gradients in a magnetic field comprising two rods of magnetic material adapted to pick up a quantity of magnetic flux from the field, means for immovably supporting said rods in predetermined spaced relation with each other and with the geometric axes of the rods in substantial alinement, and means including a plurality of magnetic devices adjustably secured to the rods and extending angularly therefrom for bringing the magnetic axes of the rods into exact parallelism with each other.

2. In a device of the character disclosed for detecting small gradients in a magnetic field, the combination of a pair of rods arranged within said magnetic field and adapted to pick up a quantity of magnetic flux from said field, means for immovably supporting said pair of rods in predetermined spaced relation with the geometric axes of the rods in substantial parallelism with each other, and a plurality of magnetic members adjustably secured to the rods and extending axially therefrom for causing the quantity of magnetic flux picked up by one of the rods to be equal to the quantity of flux picked up by the other of the rods when the device is disposed within a uniform magnetic field.

3. In a gradiometer device for detecting small disturbances within a uniform magnetic field, a pair of magnetic rods arranged in spaced relation within said field with their geometric axes in substantial parallelism with each other, means for bringing the magnetic axes of said pair of magnetic rods into exact parallelism without changing the geometric axes of the rods, a pair of opposedly connected induction coils disposed respectively on each of said rods for generating electrical signals in accordance with the difference in the rate of change of magnetic flux within each of said rods as a disturbance of the magnetic field is detected by the device, and a plurality of magnetic means adjustably secured to said rods for balancing the self-inductance of said coils.

4. In a gradiometer deivce for detecting small disturbances within a uniform magnetic field, a pair of magnetic rods arranged in spaced relation within said field with their geometric axes in substantial parallelism with each other, means for bringing the magnetic axes of said pair of magnetic rods into exact parallelism without changing the geometric axes of the rods, a pair of opposedly connected induction coils disposed respectively on each of said rods for generating electrical signals in accordance with the difference in the rate of change of magnetic flux within each of said rods as a disturbance of the magnetic field is detected by the device, a plurality of magnetic means adjustably secured to said rods for balancing the self-inductance of said coils, and means electrically connected to each of said coils and settable at will for balancing the capacity of the coils.

5. In a gradiometer device for detecting small disturbances within a uniform magnetic field, a pair of magnetic rods arranged in spaced relation within said field with their geometric axes in substantial parallelism with each other, means for bringing the magnetic axes of said pair of magnetic rods into exact parallelism without changing the geometric axes of the rods, a pairs of oppositely connected induction coils disposed respectively on each of said rods for generating electrical signals in accordance with the difference in the rate of change of magnetic flux within each of said rods as a disturbance of the magnetic field is detected by the device, a plurality of magnetic means adjustably secured to said rods for balancing the self-inductance of said coils, means electrically connected to each of said coils and settable at will for balancing the capacity of the coils, and means for adjusting the effective resistance of each of the coils to equality.

6. In gradiometer device for detecting small disturbances within a uniform magnetic field, a pair of magnetic rods arranged in spaced relation within said field with their geometric axes in substantial parallelism with each other, means for bringing the magnetic axes of said pair of magnetic rods into exact parallelism without changing the geometric axes of the rods, a pair of oppositely connected induction coils disposed respectively on each of said rods for generating electrical signals in accordance with the difference in the rate of change of magnetic flux within each of said rods as a disturbance of the magnetic field is detected by the device, a plurality of means adjustably disposed on said rods for balancing the self-inductance of the coils, a pair of variable condensers respectively connected in parallel with each of said coils for balancing the capacity of the coils, and a pair of adjustable devices in electrical circuit respectively with each of said coils for balancing the effective resistance of the coils.

7. In a gradiometer device of the character disclosed for detecting small disturbances within a uniform magnetic field, a pair of magnetic rods arranged in spaced relation within said field with their axes in substantial parallelism with each other, a pair of oppositely connected induction coils disposed respectively about each of said rods and adapted to generate electrical currents in accordance with the difference in the rate of change of magnetic flux within each of said rods as the device is moved angularly through said magnetic field, a pair of pickup coils having their axes at an angle with each other and substantially intersecting the axes of said induction coils, said pickup coils being arranged intermediate said pair of magnetic rods and substantially perpendicular thereto, a pair of resistance elements in parallel connection respectively with each of said pickup coils, and means settable at will for causing a predetermined fractional portion of the voltages generated by the pickup coils to oppose the voltages generated by the induction coils as the device is moved angularly through said magnetic field.

8. A gradiometer device for detecting disturbances within a magnetic field comprising a frame, a pair of magnetic bars adapted to pick up a quantity of magnetic flux from said field, means for securing the bars to said frame in substantial axial alinement with each other, a plurality of magnetic members adjustably secured to the bars and extending axially therefrom for balancing the flux pickup power of the bars, and means including a plurality of magnetic devices adjustably secured to said bars and extending angularly therefrom for bringing the magnetic axes of the bars into exact alinement with each other.

9. A device of the character disclosed for detecting small changes in the gradient of a magnetic field comprising means including a rod of magnetic material adapted to pick up a quantity of flux from the field, means for supporting said rod with the geometric axis thereof in a predetermined position, and means including a plurality of magnetic devices adjustably secured to the rod and extending angularly therefrom for shifting in any direction the magnetic axis of the rod with respect to said geometric axis.

10. A device of the character disclosed for detecting small changes in the gradient of a magnetic field comprising a plurality of rods of magnetic material adapted to pick up a quantity of flux from the field, means for supporting said rods in predetermined spaced relation with each other with the geometric axes of the rods in substantial parallelism, and means including a plurality of magnetic devices adjustably secured to one of the rods and extending angularly therefrom for shifting in any direction the magnetic axis of said one of the rods with respect to the geometric axis thereof.

11. A device of the character disclosed for detecting small changes in the gradient of a magnetic field comprising two rods of magnetic material adapted to pick up a quantity of magnetic flux from the field, means for supporting said rods in predetermined spaced relation with each other with the geometric axes of the rods in substantial parallelism, and means including a plurality of magnetic devices adjustably secured to the rods and extending angularly therefrom for bringing the magnetic axes of the rods into exact parallelism with each other without changing said predetermined spaced relation therebetween.

12. In a buoyant mine adapted to be moored within a body of water, in combination, means for detecting small changes in the gradient of the terrestrial magnetic field adjacent the mine, said detecting means comprising a pair of oppositely connected coils having a pair of magnetic rods respectively disposed within each of said coils and adapted to generate electric signals having a variable voltage characteristic controlled by the difference in the rate of change of the flux linkages of each of the coils with the magnetic flux respectively picked up by said rods from said magnetic field, means for supporting said coils and rods substantially immovably within the mine, and means for preventing the generation of an electric signal by said coils as the mine moves angularly within the water.

13. In a moored submarine mine of the character disclosed, in combination, means for detecting small changes in the gradient of the terrestrial magnetic field within which the mine is disposed, said detecting means comprising a pair of oppositely connected induction coils adapted to generate an electric signal in response to a change in the gradient of the magnetic field at the detecting means, said signal having a variable voltage characteristic controlled by the difference in the rate of change of the flux linkages of each of the coils with said magnetic field, a pair of magnetic rods arranged respectively within each of said coils in substantial geometric parallelism with each other and adapted to concentrate a portion of the flux of said field within the coils, and means for preventing the generation of an electric signal by said pair of coils as the mine moves angularly within the water, said last named means comprising means for bringing the magnetic axes of the rods into exact parallelism with each other without changing the geometric position of the rods, means settable at will for causing the magnetic flux picked up by one of the rods to be invariably equal to the magnetic flux picked up by the other of the rods when no foreign magnetic body is disposed within the vicinity of the mine, and means for equalizing the impedance of each coil of said pair of induction coils.

14. In a moored mine, the combination of a gradiometer device including a pair of oppositely connected induction coils adapted to generate an electrical signal having a variable voltage characteristic controlled by the rate of change of the gradient in the earth's magnetic field at the coils and caused by a foreign magnetic body disposed within the vicinity of the mine, a mine firing mechanism adapted to be operated by said signal when said voltage reaches a predetermined value, and means for preventing the generation of an electrical signal by said coils when the value of said gradient is zero and the device moves angularly within said magnetic field.

(References on following page)

References Cited in the file of this patent

UNITED STATES PATENTS

| | | |
|---|---|---|
| 542,732 | Huskisson | July 16, 1895 |
| 1,907,864 | Perry | May 9, 1933 |
| 1,971,549 | Woodward | Aug. 28, 1934 |
| 1,992,100 | Stein | Feb. 19, 1935 |
| 2,123,045 | Hoare | July 5, 1938 |
| 2,296,754 | Wolf et al. | Sept. 22, 1942 |

FOREIGN PATENTS

| | | |
|---|---|---|
| 9,581 | Great Britain | of 1910 |
| 112,635 | Great Britain | Jan. 13, 1918 |
| 130,050 | Great Britain | July 31, 1919 |
| 130,350 | Great Britain | Aug. 7, 1919 |
| 803,907 | France | July 20, 1936 |